# partial, see below

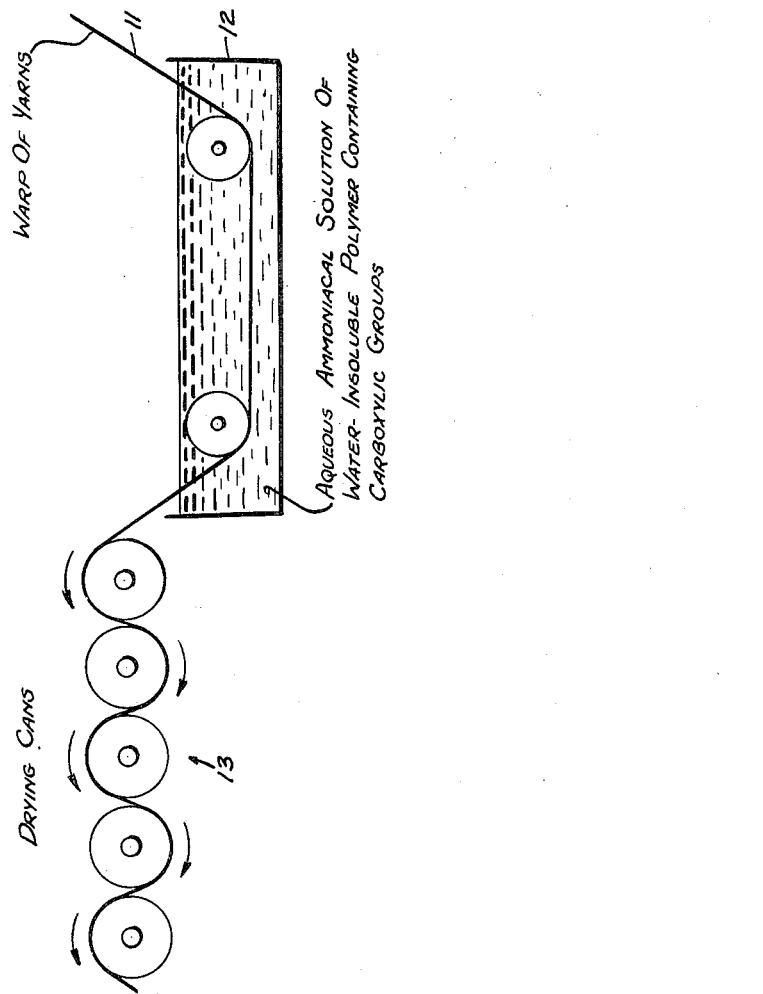

United States Patent Office 2,769,727
Patented Nov. 6, 1956

2,769,727

SIZING AND DRYING OF FILAMENTARY MATERIAL

Seth T. Bowen, Union, and Fred Fortess, Summit, N. J., assignors to Celanese Corporation of America, New York, N. Y., a corporation of Delaware Application May 1, 1953, Serial No. 352,580

1 Claim. (Cl. 117—103)

This invention relates to the sizing of filamentary materials and relates more particularly to the sizing of filamentary materials with ammoniacal solutions of acidic polymers.

One method which has been employed for the sizing of filamentary materials involves the application to said materials of an acidic water-insoluble linear polymer containing carboxylic acid groups, such as a copolymer of vinyl acetate and maleic acid. Generally this polymer is employed in the form of a solution prepared by dissolving the polymer in aqueous ammonia which converts at least some of the carboxylic acid groups to ammonium salt groups. The resulting solution, which may also contain a textile lubricant, if desired, is applied to the filamentary material, after which the filamentary material is heated to remove the water of the solution by evaporation. This heating step drives off ammonia and thus converts the ammonium salt groups back into carboxylic acid groups, thereby making the polymer insoluble in water. During this heating step some of the ammonium salt groups may also form amide groups, through splitting out of water. In the past, the heating step has usually been carried out by bringing the wet filamentary material into contact with a series of drying cans, which are heated hollow, cylindrical, rotatably mounted drums having polished metal outer surfaces. The wet filamentary material passes successively over and under the heated, rotating cans while the cans are being rotated at such speeds that the linear velocity of the surface of each can is substantially equal to the linear velocity of the filamentary material in contact therewith. The first can engaged by the wet filamentary material is generally maintained at a temperature of about 155° F., and succeeding cans are maintained at progressively higher temperatures, e. g., 165° F., 175° F., etc., the final can being usually at a temperature of about 200° F. In the process described above the sized filamentary material tends to stick to the polished metal surfaces of the cans and particles of the size accumulate on said surfaces, particularly on the surface of the first can engaged by the wet filamentary material. As a result the dried filamentary material does not carry a uniform coating of the size and frequently feels sandy to the touch, which is manifestly undesirable.

It is, therefore, an object of this invention to provide a novel process for the sizing of filamentary materials which will be free from the foregoing and other difficulties.

A further object of this invention is the provision of a new and improved process for sizing warps of yarn, using an aqueous ammoniacal solution of an acidic, water-insoluble linear polymer containing carboxylic acid groups.

Other objects of this invention will be apparent from the following description and claim.

According to our invention an aqueous ammoniacal solution of an acidic, water-insoluble linear polymer containing carboxylic acid groups is applied to a filamentary material and the resulting wet filamentary material is dried by placing it into contact with at least one heated surface, such as the polished metal surface of a drying can, the temperature of the first heated surface engaged by said wet material being at least about 205° F., preferably about 205° F. to 230° F. We have found, unexpectedly, that when the first heated surface engaged by the wet sized filamentary material is at this high temperature there is practically no tendency for the sizing material to stick to any of the heated drying surfaces.

As stated, the sizing material employed in the process of the present invention is a water-insoluble polymer having carboxylic acid groups. Examples of suitable polymers which may be used include the substantially linear resinous copolymers of vinylidene compounds, e. g. vinyl acetate, vinyl chloride or styrene, with ethylenically unsaturated carboxylic acids or anhydrides, e. g. maleic acid, maleic anhydride, fumaric acid, itaconic acid, acrylic acid or methacrylic acid. For the purpose of this invention the term "acid" includes the corresponding anhydride, since anhydride groups are converted by the ammonia water into ammonium salt groups and then are changed to acid groups during the drying step. Other water-insoluble polymers which are soluble in aqueous ammonia, such as partly hydrolyzed polyacrylonitrile, may also be employed. When a copolymer is used the proportions of the acid in the copolymer may vary widely, but should be such as to make the copolymer soluble in ammonia water but insoluble in water, per se. Optimum results have been obtained with copolymers of vinyl acetate, more particularly with copolymers of vinyl acetate and maleic acid having a content of carboxyl groups of 2 to 5% based on the weight of the polymer.

The sizing composition employed in the process of the present invention may also contain a textile lubricant dissolved or emulsified therein. The presence of a lubricant provides the sized filamentary material with increased resistance to the abrasive effect of any subsequent textile operations, e. g. weaving or knitting, and also make it easier to carry out such subsequent operations. Any of the well known textile lubricants suitable for this purpose may be employed. However, certain compounds such as polyoxyethylene sorbitan esters of higher fatty acids, e. g. polyoxyethylene sorbitan monostearate, sold under trademark "Tween 60," and sulfonated pine oil, sold under the trademark "Nopco 1440," are not only lubricants, but have the additional effect of overcoming any residual tendency for the polymer to stick to the drying cans. The proportion of lubricant may vary widely; for example, it may be about 1 to 5%, based on the weight of the polymer.

The sizing composition may also contain materials for cross-linking the acidic polymer. During the heating and drying step such materials react with the acidic polymer to produce on the filamentary material an insoluble, cross-linked structure, whose resistance to washing with alkaline soaps is much better than that of the non-cross-linked polymers. Examples of suitable cross-linking agents are urea-formaldehyde condensation products, such as are sold under the trademark "Zeset S," or melamine formaldehyde condensation products, such as are sold under the trademark "Resloom M-75." The proportions of the cross-linking agent may be varied over a wide range, e. g. from 25 to 75%, based on the weight of the polymer.

The aqueous ammoniacal sizing composition may be applied to the filamentary material in any suitable manner well known in the prior art. For example, it may be applied by passing the filamentary material through a bath of the composition. The composition may also be applied to the filamentary material by means of one or more rollers. If desired, any excess of the sizing composition may be removed from the filamentary material, as by passing the material through squeeze rolls, before the wet filamentary material is placed into contact with the heated drying cans.

The surfaces of the drying cans are generally made of stainless steel, such as chromium-nickel stainless steel. However, any other suitable substance may be employed as the surface material of the can, for example, chromium plated black iron.

It is not necessary to maintain the surfaces of all of the drying cans at a temperature of at least about 205° F. Only the first can engaged by the filamentary material need be maintained at this temperature, while the succeeding cans may be at a lower temperature, e. g. 180 to 200° F. However, at the drying speeds commonly employed, e. g. 25 to 35 yards per minute, and with the usual drying cans, it is desirable to maintain the surfaces of the first two cans at the temperature of at least about 205° F.

The process of this invention may be employed for sizing any type of filamentary material. It is particularly suitable for the sizing of yarns or fabrics made of cellulose acetate or other organic derivatives of cellulose such as cellulose esters, e. g. cellulose propionate, cellulose butyrate, cellulose acetate-butyrate, or cellulose ethers, e. g. ethyl cellulose or benzyl cellulose. Outstanding results have been obtained when the process is employed for sizing yarns made of pigmented cellulose acetate e. g. yarns made by extruding a cellulose acetate solution containing a pigment suspended therein. When such sized yarns are woven or knitted into the form of a fabric such fabric may be employed directly for the manufacture of garments, without the usual subsequent scouring and finishing treatments which are generally necessary before a woven or knitted fabric is suitable for conversion into a garment.

In the accompanying drawing, which illustrates diagrammatically one aspect of this invention, reference numeral 11 designates a warp of yarns which is led through a suitable tank 12 containing the aqueous ammoniacal solution of the water-insoluble polymer containing carboxylic groups and then over a plurality of heated drying cans indicated generally by reference numeral 13.

In order to further illustrate this invention, but without being limited thereto, the following examples are given.

*Example I*

7.2 pounds of ammonia are added to 65 gallons of cold water. To this mixture there are then added slowly, with stirring, 60 pounds of a resinous copolymer of vinyl acetate and maleic anhydride in which the anhydride groups, calculated as carboxylic acid groups, constitute about 3% of the weight of the copolymer. During the addition of the copolymer the mixture is heated gradually until it attains a temperature of 160° F. After the mixture has been maintained at 160° F. for 30 minutes, 2 pounds of "Tween 60," a polyoxyethylene sorbitan monostearate, are added thereto with stirring and the resulting mixture is then diluted with water until its volume is 100 gallons. The diluted mixture is applied, at a temperature of 130° F., by means of a slasher to a warp made of pigmented cellulose acetate yarns. The sized warp, carrying 40 to 60% of its weight of the sizing solution, is then passed over and under a series of 7 heated rotatable stainless steel drying cans, with opposite faces of the warp alternately engaging successive cans. The cans are rotated at such speeds that the linear velocity of each can is substantially equal to the linear velocity of the portion of the warp in contact therewith, i. e. 25 to 30 yards per minute, while the warp travels at such a rate that it takes 40 to 60 seconds for one point on the warp to travel over and under all of said cans. Each drying can is maintained at a temperature of 210° F., so that the surface thereof is at a temperature of about 205° F. A smooth, uniformly sized warp is obtained. The sizing composition shows substantially no tendency to stick to the cans. All of the drying cans are free from deposits of the sizing composition, even after said cans have been employed for 16 hours in this process.

*Example II*

Example I is repeated except that the first drying can engaged by the sized warp is maintained at 155° F. and succeeding cans are maintained at gradually increasing temperatures, i. e. 165° F., then 175° F. and finally 200° F. The size has a considerable tendency to stick to the cans, so that after being in use for ½ hour the cans are no longer suitable for producing a smooth evenly sized warp.

It is to be understood that the foregoing detailed description is given merely by way of illustration and that many variations may be made therein without departing from the spirit of our invention.

Having described our invention what we desire to secure by Letters Patent is:

Process for the production of sized filamentary material, which comprises applying to filamentary material comprising pigmented cellulose acetate yarns an aqueous ammoniacal solution of a water-insoluble copolymer of vinyl acetate and an ethylenically unsaturated carboxylic acid, said copolymer having a carboxyl content of 2 to 5% by weight, and drying the filamentary material carrying said solution by passing said filamentary material at the rate of about 25 to 35 yards per minute over a plurality of drying cans having smooth stainless steel surfaces, the first two heated cans engaged by said filamentary material being at temperatures of 205° F. to 230° F. and the succeeding cans being at temperatures of 180° F. to 200° F.

References Cited in the file of this patent

UNITED STATES PATENTS

| | | |
|---|---|---|
| 2,015,103 | Dreyfus | Sept. 24, 1935 |
| 2,067,219 | Whitehead | Jan. 12, 1937 |
| 2,418,752 | Brown | Apr. 8, 1947 |
| 2,436,978 | Standley et al. | Mar. 2, 1948 |
| 2,576,915 | Barrett | Dec. 4, 1951 |
| 2,609,350 | Spatt | Sept. 2, 1952 |
| 2,628,176 | Longmeadow et al. | Feb. 10, 1953 |

OTHER REFERENCES

American Cotton Handbook, 1st ed., 1941, pages 438 and 439.